United States Patent
Rafanavičius et al.

(10) Patent No.: US 12,353,546 B2
(45) Date of Patent: Jul. 8, 2025

(54) METHOD AND APPARATUS FOR CREATING A MALWARE DETECTION DATASET

(71) Applicant: UAB 360 IT, Vilnius (LT)

(72) Inventors: Justas Rafanavičius, Vilniaus (LT); Aleksandr Ševčenko, Vilnius (LT)

(73) Assignee: UAB 360 IT, Vilnius (LT)

( * ) Notice: Subject to any disclaimer, the term of this patent is extended or adjusted under 35 U.S.C. 154(b) by 384 days.

(21) Appl. No.: 17/870,419

(22) Filed: Jul. 21, 2022

(65) Prior Publication Data

US 2024/0028716 A1    Jan. 25, 2024

(51) Int. Cl.
*H04L 9/00*        (2022.01)
*G06F 16/28*       (2019.01)
*G06F 21/56*       (2013.01)
*G06F 21/57*       (2013.01)

(52) U.S. Cl.
CPC ............ *G06F 21/56* (2013.01); *G06F 16/285* (2019.01); *G06F 21/577* (2013.01)

(58) Field of Classification Search
CPC ....... G06F 21/56; G06F 16/285; G06F 21/577
USPC ........................................................... 726/24
See application file for complete search history.

(56) References Cited

U.S. PATENT DOCUMENTS

| | | | |
|---|---|---|---|
| 2016/0088000 A1* | 3/2016 | Siva Kumar | H04L 63/1416 726/23 |
| 2016/0381042 A1* | 12/2016 | Zhang | H04L 63/1416 726/24 |
| 2018/0041536 A1* | 2/2018 | Berlin | H04L 63/1416 |
| 2019/0228151 A1* | 7/2019 | Schmugar | H04L 63/145 |
| 2022/0131889 A1* | 4/2022 | Scheideler | G06F 21/554 |

* cited by examiner

*Primary Examiner* — Christopher J Brown
(74) *Attorney, Agent, or Firm* — Moser Taboada

(57) ABSTRACT

A method and apparatus for generating a malware detection dataset. The method accesses a database comprising malware files and metadata related to the files. The metadata is ranked and the rankings combined into a relevancy score. The most relevant files in the database are identified as malware samples. The malware samples and their related scores are stored in a malware detection dataset.

20 Claims, 3 Drawing Sheets

METHOD AND APPARATUS FOR CREATING A MALWARE DETECTION DATASET

FIELD

The present invention relates generally to malware detection, and more particularly, to a method and apparatus for creating a malware detection dataset for use in training a machine learning based malware detector.

BACKGROUND

Malware (malicious software) is ubiquitous on the Internet in the form of ransomware, computer viruses, worms, trojans, spyware, keyloggers, and so on. Malware may be intended to impact the functionality of computers and computer networks by interfering with security, privacy, and/or hardware functionality. Most malware is inadvertently downloaded by a user from the internet. The malware may be hidden in what looks to be a legitimate application or may be attached to a downloaded file.

Malware detection software searches computer files in memory (e.g., volatile or non-volatile memory) and/or files as they are downloaded to identify malware before it is activated. The process of building malware identification datasets is tedious. The public and private networks must be constantly monitored for new malware or previous malware that has been adapted to avoid detection. Once identified, the malware is scrutinized to determine "samples"—portions of code—to be used to identify the malware. The samples are placed in malware datasets to be used to identify when the malware is embedded in applications or files.

Currently, the datasets are used as databases for comparison to the content of incoming files. A character string match results in malware detection. More recently, the datasets have been used to train neural networks used by malware detectors in an attempt to learn to detect malware that is not specifically contained in the datasets. In this manner, the malware detector may anticipate new malware. However, the information used in current datasets is not optimized for neural network training and can lead to errors in malware detection.

Therefore, there is a need for improved methods and apparatuses for creating a malware dataset.

SUMMARY

A method and apparatus for creating a malware dataset. The method accesses a database comprising malware files and, in some instances, clean files. The files are analyzed to determine file metadata. The metadata is converted to a relevancy score. The files are rated with the relevancy. The most relevant files are included into a final dataset as malware samples. The dataset is used for training machine learning based malware detectors.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
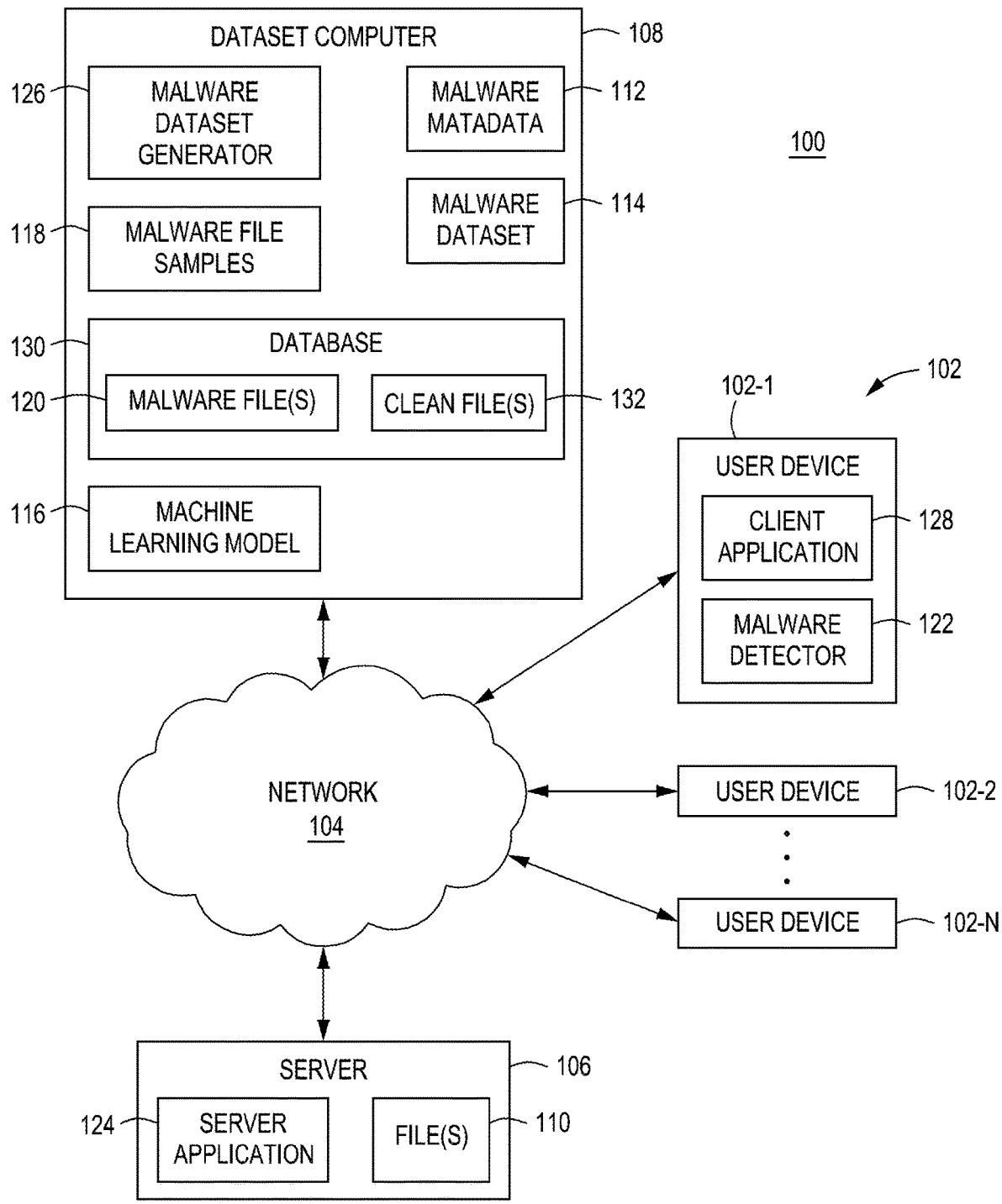
FIG. 1 illustrates an example of a computer system for creating a malware detection dataset in accordance with at least one embodiment of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, apparatuses, and systems) for generating at least one malware detection dataset. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present invention generate at least one malware detection dataset. In some embodiments, a database containing malware files and, in some instances, clean files is accessed by a machine learning algorithm and the algorithm assigns a relevancy score or ranking to each file. The relevancy score or ranking reflects various attributes of the file. The attributes may be metadata associated with the file, i.e., found within the file or supplied from sources other than the file itself. Such attributes include target operating system, target hardware, encounter dates, author date, number of times the sample is found in other files (prevalence), etc. The ranking identifies the level of relevancy (maliciousness) of the malware file. The rankings of each attribute are combined using, for example, a weighted summation to generate a final relevancy score for a given file. The files and the final relevancy scores are analyzed to identify the most relevant malware files in the database. These most relevant files form a dataset that may be used to train a machine learning algorithm to process new files and identify whether the file(s) contains malware.

Thus, methods and apparatuses consistent with embodiments of this present invention generate a malware detection dataset. Such a dataset may be used to train a machine learning (ML) model of a malware detector to scan files and block or remove files containing malware before they are accessed by a user device. Details of such methods and apparatuses are described in detail below with respect to the figures.

FIG. 1 illustrates an example of a computer system 100 for generating and using a malware detection dataset in accordance with at least one embodiment of the invention. In FIG. 1, the system 100 comprises at least one user device 102, a server 106, and a computer network 104, (e.g., the Internet) connecting the server 106 to the user devices 102. The server 106 is a centralized computing device used to execute the application(s) (server application 124) and communicate file(s) 110 to user devices 102. The files 110 may contain malware. The general structure of such a server and/or user device is described in detail below with respect to FIG. 3.

Also connected to the network 104 is a dataset computer 108 configured to generate a malware detection dataset 114 in accordance with the present invention. The dataset 114 is used to train a malware detector 122 executed by the user devices 102. The dataset computer 108 comprises a malware dataset generator 126 that utilizes a machine learning model 116 to generate a malware dataset 114. The generator 126 analyzes the metadata 112 of malware containing files 120 within a file database 130 to identify malware file samples 118 to be included in the dataset 114. The file database 130 may also contain clean files 132. The generator 126 analyzes a database 130 and related metadata (as described in detail in relation to FIG. 2) to produce malware detection dataset 114 for training of the machine learning model 116. As described below, the generator 126 uses various ranking and scoring techniques to build the dataset 114.

User devices 102-1, 102-2, 102-3 ... 102-N (collectively referred to as user devices 102) communicate through network 104 with the server 106. In some embodiments, user device 102 can be any computing device capable of hosting a malware detector 122 (executable software) and a client application 128 (browser or other applications that accesses or otherwise uses files and can be affected by malware). User device 102 may comprise any device that is connected to a network, including, for example, a laptop, a mobile phone, a tablet computer, a desktop computer, a smart device, a router, and other network devices. The client application 128 is a well-known application for accessing and displaying web page content, e.g., file(s) delivered by the server 106. Such browsers include, but are not limited to, Safari®, Chrome®, Explorer®, Firefox®, etc. In other embodiments, the client application 128 may be any type of application that can be affected by malware.

In operation, the malware detector 122 uses a trained machine learning model (e.g., model 116) that is ported from the malware dataset generator 126 to the user devices 102. In operation, the malware dataset generator 126 analyzes malware files 120 and clean files 132 from the database 130 to produce a malware dataset 114. The dataset is used to train the machine learning model 116. The trained model is then transferred to the malware detector 122 used by each user device 102. The files 110 received by the user devices 102 via the network are applied to the malware detector 122. The malware detector 122 identifies which files contain malware by applying the files to the local machine learning model and removes or isolates the files that are found to contain malware. The entire model 116 may be transferred to the detector 122 or, alternatively, the dataset 114 may be transferred to the detector 122 to train a machine learning model locally to the user device 102. Occasionally, the model or dataset is updated to reflect additional malware that is detected by the dataset generator 126.

Figure 2:
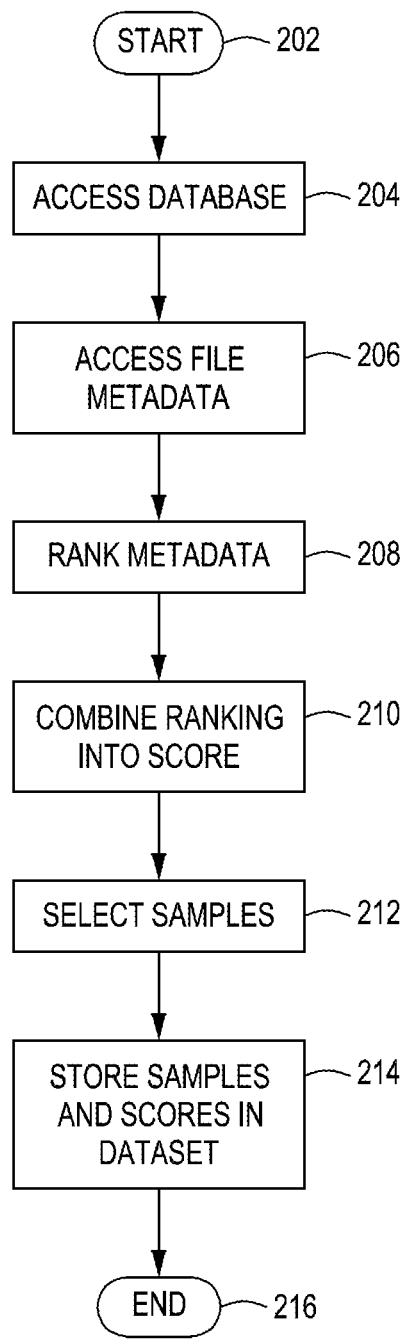
FIG. 2 is a flow diagram of a method for creating a malware detection dataset in accordance with at least one embodiment of the present invention.

FIG. 2 illustrates an exemplary flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is a flow diagram of a method 200 for generating a malware detection dataset in accordance with at least one embodiment of the present principles. The method 200 begins at 202 and proceeds to 204 where the database of clean and malware files is accessed (i.e., recalled from memory).

At 206, for each file in the database, the method 200 accesses the file metadata that is associated with the each of the files. This metadata may include, but is not limited to, author information, publication date, first and last encounter dates, prevalence of the sample, the target operating system, the target hardware, malware operating profile and the like. This metadata may be found within the file or be supplied from a source outside of the file.

At 208, the method 200 ranks the metadata based upon its relevancy. For example, a relatively new publication or encounter date may be more relevant than an old date; a file that is prevalent may be more relevant than a sample that is hardly ever encountered; a file that is designed to attack a new version of hardware or operating system may be more relevant than a file that is intended for an old operating system or hardware; and an operating profile that steals personal information or is ransomware may be more highly ranked than a malware that merely causes processing errors.

At 210, the rankings are combined into an overall score for the file. In one embodiment, the rankings are combined using a formulaic approach. For example, the combination may be a weighted sum of rankings, a normalized sum of rankings, or some combination of weighting and normalization. In an effort to remove human biases in combining rankings, rankings may be combined using a machine learning algorithm. In other embodiments, statistical analysis may be used to combine the rankings. The analysis and/or weightings used in combining the rankings may be updated regularly to reflect changes in malware threats, i.e., relevancy changes over time.

At 212, the method 200 selects files with the highest relevancy (i.e., highest scores) as malware samples. At 214, the selected samples and their associated scores are stored in a malware detection dataset. Once the dataset is populated with relevant samples and scores, the method 200 ends at 214.

The malware detection dataset may be used for training machine learning models to detect the malware samples identified in the dataset as well as unknown samples. The scores are useful to establish weights and biases within a neural network that is trained to identify malware samples in files that the neural network has not used for training. The scores enable the neural network to understand the characteristics of malware such that unknown malware samples may be identified and classified.

Figure 3:
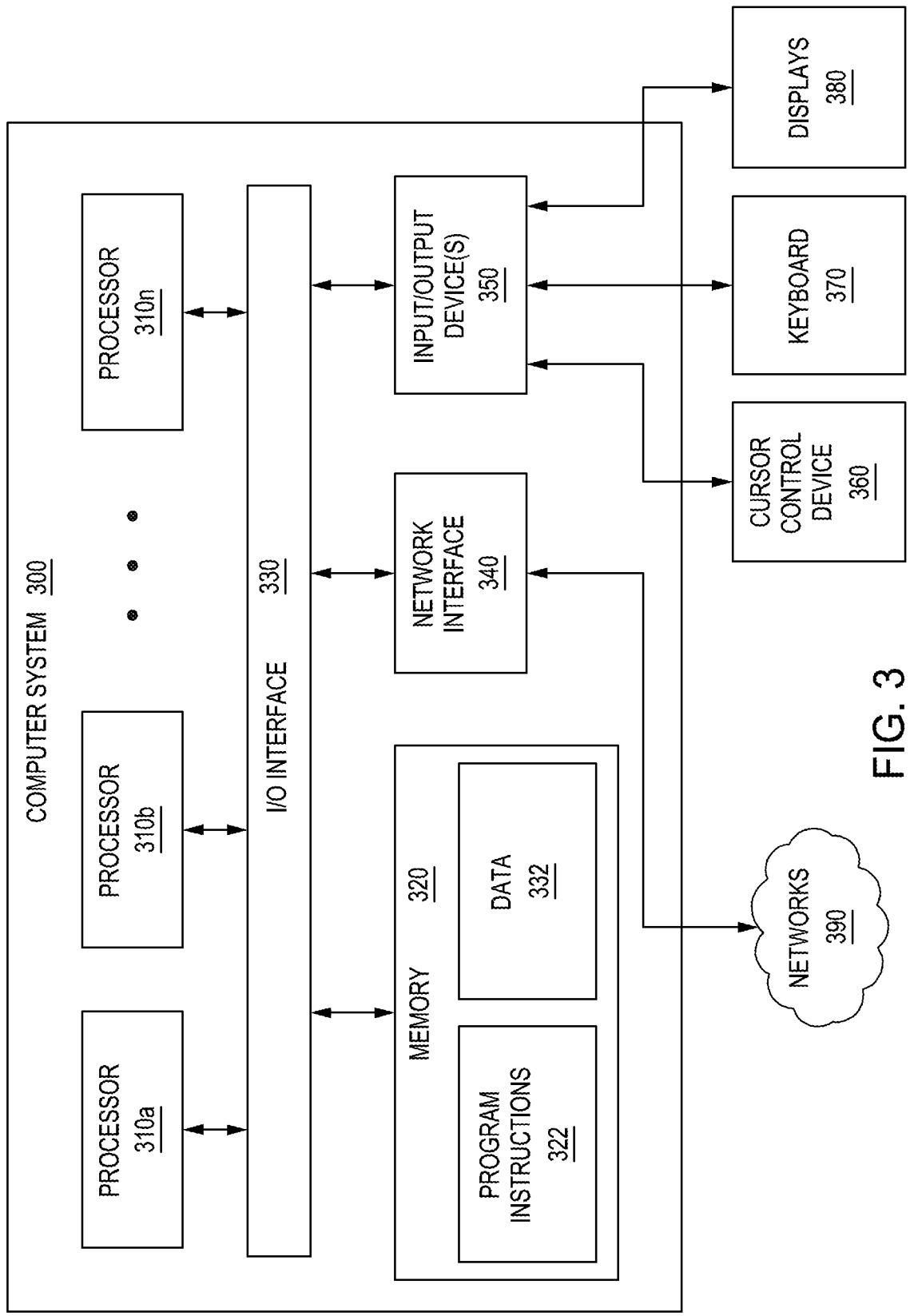
FIG. 3 depicts a high-level block diagram of a computing device suitable for use with embodiments of a system for generating a malware detection dataset in accordance with at least one embodiment of the invention.

FIG. 3 depicts a computer system 300 that can be utilized in various embodiments of the present invention to implement the computer and/or the display, according to one or more embodiments.

Various embodiments of method and system for generating a dataset, as described herein, may be executed on one or more computer systems, which may interact with various other devices. One such computer system is computer system 300 illustrated by FIG. 3, which may in various embodiments implement any of the elements or functionality illustrated in FIGS. 1 and 2. In various embodiments, computer system 300 may be configured to implement methods described above. The computer system 300 may be used to implement any other system, device, element, functionality or method of the above-described embodiments. In the illustrated embodiments, computer system 300 may be configured to implement the user devices 102, dataset computer 108 and server 106 and implement the method 300 as processor-executable executable program instructions 322 (e.g., program instructions executable by processor(s) 310) in various embodiments.

In the illustrated embodiment, computer system 300 includes one or more processors 310*a*-310*n* coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of the processors 310 may commonly, but not necessarily, implement the same ISA.

System memory 320 may be configured to store program instructions 322 and/or data 332 accessible by processor 310. In various embodiments, system memory 320 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description on a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

EXAMPLE CLAUSES

A. A method for generating a malware detection dataset comprising:
  accessing a database comprising malware files;
  accessing malware file metadata;
  ranking the metadata associated with each malware file;
  combining the rankings into a relevancy score for each malware file;
  analyzing the relevancy scores to identify relevant malware files as malwares samples and
  storing the malware samples and associated relevancy scores in the malware detection dataset.

B. The method of clause A, wherein the metadata comprises at least one of author information, publication date, first and last encounter dates, prevalence information, the target operating system, the target hardware.

C. The method of clauses A or B, wherein a larger prevalence is higher ranked than lower prevalence.

D. The method of clauses A-C, wherein a recent publication is higher ranked than an old publication date.
E. The method of clauses A-D, wherein a recently released operating system or hardware has a higher ranking than an old release of an operating system or hardware.
F. The method of clauses A-E, wherein extracting further comprises reviewing content of a file for particular strings of characters representing the malware sample.
G. The method of clauses A-F, wherein the database comprises clean files.
H. The method of clauses A-G, wherein combining further comprises at least one of generating a weighted sum of rankings, generating a normalized sum of rankings or generating a weighted and normalized sum of rankings.
I. The method of clauses A-H, wherein combining further comprises using neural network to combine rankings.
J. The method of clauses A-I, wherein extracting further comprises using a neural network to identify and classify the malware sample in the file.
K. Apparatus for generating a malware detection dataset comprising at least one processor coupled to at least one non-transitory computer readable medium having instructions stored thereon, which, when executed by the at least one processor, cause the at least one processor to perform operations comprising:
accessing a database comprising malware files;
accessing malware file metadata;
ranking the metadata associated with each malware file;
combining the rankings into a relevancy score for each malware file;
analyzing the relevancy scores to identify relevant malware files as malwares samples and
storing the malware samples and associated relevancy scores in the malware detection dataset.
L. The apparatus of clause K, wherein the metadata comprises at least one of author information, publication date, first and last encounter dates, prevalence information, the target operating system, the target hardware.
M. The apparatus of clauses K or L, wherein a larger prevalence is higher ranked than lower prevalence.
N. The apparatus of clauses K-M, wherein a recent publication is higher ranked than an old publication date.
O. The apparatus of clauses K-N, wherein a recently released operating system or hardware has a higher ranking than an old release of an operating system or hardware.
P. The apparatus of clauses K-O, wherein extracting further comprises reviewing content of a file for particular strings of characters representing the malware sample.
Q. The apparatus of clauses K-P, wherein the database comprises clean files.
R. The apparatus of clauses K-Q, wherein combining further comprises at least one of generating a weighted sum of rankings, generating a normalized sum of rankings or generating a weighted and normalized sum of rankings.
S. The apparatus of clauses K-R, wherein combining further comprises using neural network to combine rankings.
T. The apparatus of clauses K-S, wherein extracting further comprises using a neural network to identify and classify the malware sample in the file.

What is claimed is:

1. A method for generating a malware detection dataset comprising: accessing a database comprising malware files, wherein each malware file is a file that includes malware; accessing malware file metadata of the malware files; ranking the metadata associated with each malware file; combining the rankings into a relevancy score for each malware file, wherein the relevancy score represents a level of maliciousness of the malware file; analyzing the relevancy scores to identify relevant malware files having at least a certain relevancy score as the most relevant malware files as malware samples of the malware detection dataset; and storing the most relevant malware samples and associated relevancy scores in the malware detection dataset, wherein the most relevant malware samples and associated relevancy scores are used to train a machine learning model of a malware detector to detect malware in other files not used for training.

2. The method of claim 1, wherein the metadata comprises at least one of author information, publication date, first and last encounter dates, prevalence information, the target operating system, the target hardware.

3. The method of claim 2, wherein a larger prevalence is higher ranked than lower prevalence.

4. The method of claim 2, wherein a recent publication is higher ranked than an old publication date.

5. The method of claim 2, wherein a recently released operating system or hardware has a higher ranking than an old release of an operating system or hardware.

6. The method of claim 1, wherein accessing malware file metadata further comprises reviewing content of a file for particular strings of characters representing the malware sample.

7. The method of claim 1, wherein the database comprises clean files.

8. The method of claim 1, wherein combining further comprises at least one of generating a weighted sum of rankings, generating a normalized sum of rankings or generating a weighted and normalized sum of rankings.

9. The method of claim 1, wherein combining further comprises using neural network to combine rankings.

10. The method of claim 1, wherein accessing malware file metadata further comprises using a neural network to identify and classify the malware sample in the file.

11. Apparatus for generating a malware detection dataset comprising at least one processor coupled to at least one non-transitory computer readable medium having instructions stored thereon, which, when executed by the at least one processor, cause the at least one processor to perform operations comprising: accessing a database comprising malware files, wherein each malware file is a file that includes malware; accessing malware file metadata of the malware files; ranking the metadata associated with each malware file; combining the rankings into a relevancy score for each malware file, wherein the relevancy score represents a level of maliciousness of the malware file; analyzing the relevancy scores to identify relevant malware files having at least a certain relevancy score as the most relevant malware files as malware samples of the malware detection dataset; and storing the most relevant malware samples and associated relevancy scores in the malware detection dataset, wherein the most relevant malware samples and associated relevancy scores are used to train a machine learning model of a malware detector to detect malware in other files not used for training.

12. The apparatus of claim 11, wherein the metadata comprises at least one of author information, publication date, first and last encounter dates, prevalence information, the target operating system, the target hardware.

13. The apparatus of claim 12, wherein a larger prevalence is higher ranked than lower prevalence.

14. The apparatus of claim 12, wherein a recent publication is higher ranked than an old publication date.

15. The apparatus of claim 12, wherein a recently released operating system or hardware has a higher ranking than an old release of an operating system or hardware.

16. The apparatus of claim 11, wherein extracting accessing malware file metadata further comprises reviewing content of a file for particular strings of characters representing the malware sample.

17. The apparatus of claim 11, wherein the database comprises clean files.

18. The apparatus of claim 11, wherein combining further comprises at least one of generating a weighted sum of rankings, generating a normalized sum of rankings or generating a weighted and normalized sum of rankings.

19. The apparatus of claim 11, wherein combining further comprises using neural network to combine rankings.

20. The apparatus of claim 11, wherein accessing malware file metadata further comprises using a neural network to identify and classify the malware sample in the file.

* * * * *